United States Patent
Chen et al.

(10) Patent No.: US 8,902,613 B2
(45) Date of Patent: Dec. 2, 2014

(54) INTEGRATED CONVERTER WITH SINGLE-ENDED CONTROL, POWER FACTOR CORRECTION, AND LOW OUTPUT RIPPLE

(71) Applicant: Phihong Technology Co., Ltd., Taoyuan County (TW)

(72) Inventors: Chun-Chen Chen, Taoyuan County (TW); Po-Ching Yu, Taoyuan County (TW); Wei-Chun Chang, Taoyuan County (TW)

(73) Assignee: Phihong Technology Co., Ltd., Taoyuan County (TW)

( * ) Notice: Subject to any disclaimer, the term of this patent is extended or adjusted under 35 U.S.C. 154(b) by 0 days.

(21) Appl. No.: 13/923,100

(22) Filed: Jun. 20, 2013

(65) Prior Publication Data

US 2014/0293657 A1    Oct. 2, 2014

(30) Foreign Application Priority Data

Apr. 2, 2013  (TW) ............................. 102111976 A

(51) Int. Cl.
  *H02M 3/335*   (2006.01)
  *G05F 1/24*    (2006.01)
  *H02M 7/217*   (2006.01)

(52) U.S. Cl.
  CPC .................................. *H02M 7/2176* (2013.01)
  USPC ........................................ 363/21.01; 323/259

(58) Field of Classification Search
  USPC ................ 363/20, 21.01, 37, 39, 40, 65, 131; 323/259, 344
  See application file for complete search history.

(56) References Cited

U.S. PATENT DOCUMENTS

| | | | |
|---|---|---|---|
| 3,491,281 A * | 1/1970 | Penn | 331/112 |
| 4,150,652 A * | 4/1979 | Nagasawa | 123/406.57 |
| 4,392,172 A * | 7/1983 | Foley et al. | 361/8 |
| 4,983,902 A * | 1/1991 | Palaniappan et al. | 318/701 |
| 6,507,176 B2 * | 1/2003 | Wittenbreder, Jr. | 323/259 |
| 7,635,953 B2 * | 12/2009 | Tumula et al. | 315/94 |
| 7,915,875 B2 * | 3/2011 | Asuke et al. | 323/259 |
| 2011/0292693 A1 * | 12/2011 | Niijima et al. | 363/21.17 |
| 2012/0043923 A1 * | 2/2012 | Ikriannikov et al. | 320/103 |
| 2012/0169240 A1 * | 7/2012 | Macfarlane | 315/152 |
| 2013/0088078 A1 * | 4/2013 | Shteynberg et al. | 307/31 |
| 2013/0147441 A1 * | 6/2013 | Lee et al. | 320/167 |

* cited by examiner

*Primary Examiner* — Adolf Berhane
(74) *Attorney, Agent, or Firm* — Huntington IP Consulting Co., Ltd.; Chih Feng Yeh

(57) ABSTRACT

An integrated converter with single-ended control and power factor correction includes an input unit, a boost inductor, a voltage regulator, an energy-storing capacitor, a buck-boost converter, a single-ended switch and a control unit. The voltage regulator and the buck-boost converter share the single-ended switch and the control unit in order to correct power factor, reduce output ripple, simplify the complexity of circuit and decrease the number of components. The voltage regulator is utilized in reducing the frequency of switching and the conductive losses, thus improving overall performance. With the magnetic loop, the transformers of the boost inductor and the voltage regulator can be merged, and thus the efficiency of the whole spatial usage is increased and the noise interference is reduced.

10 Claims, 4 Drawing Sheets

INTEGRATED CONVERTER WITH SINGLE-ENDED CONTROL, POWER FACTOR CORRECTION, AND LOW OUTPUT RIPPLE

FIELD OF THE INVENTION

The present invention relates to a converter, and more particularly to an integrated converter with single-ended control, power factor correction (PFC), and low output ripple.

DESCRIPTION OF THE PRIOR ART

FIG. 1 illustrates a traditional power-converting circuit, wherein the traditional power-converting circuit includes a rectifying circuit 91, a PFC (power factor correction) circuit 92, a DC (Direct Current) to DC converter 93, an anterior controller 94, and a posterior controller 95. The PFC circuit 92 is coupled to and between the rectifying circuit 91 and the DC to DC converter 93.

The PFC circuit 92 is coupled to an AC (Alternating Current) source 90 through the rectifying circuit 91 so as to acquire an AC supply. The PFC circuit 92 includes a boost inductor 921, a capacitor 922, a diode 923, and a switch 924.

The rectifying circuit 91 is coupled to an AC source 90. The switch 924 is coupled to the output end of the rectifying circuit 91 through boost inductor. The capacitor 922 is connected in parallel to the switch 924. The anterior controller 94 is coupled to the control end of the switch 924, so as to control the conduction of the switch 924 and further control the storage voltage of the capacitor 922 by outputting a control signal.

The converter 93 is coupled to the PFC circuit 92 and therefore gains a direct current. The converter 93 includes two windings 931, 932 located at the primary and secondary sides respectively and a switch 933. The posterior controller 95 is coupled to the control end of the switch 933, so as to control the conduction of the switch 933 by outputting a control signal.

Therefore, the traditional circuit uses the anterior PFC circuit 92 to achieve the goal of boosting and modifying the power factor, while the posterior converter 93 uses the anterior circuit 92 to output voltage and proceed with voltage regulation so as to provide loading usage. Since the whole circuit needs to use two sets of transistor switches 924, 933 and controllers 94, 95, the conductive losses will be greater. Furthermore, the voltage stress of the output capacitor 922 of the anterior circuit 92 increases with the boosting voltage. Hence, when considering the capacitor 922, the capacitor with higher voltage must be chosen for safety purpose, which causing the increase of cost. Besides, also owning to generating higher output ripple, the output voltage will fluctuate more significantly, and the output voltage will be more unsteady, which may affect the posterior loading.

SUMMARY OF THE INVENTION

The present invention provides an integrated converter, which merely utilizes a single controller at the posterior circuit (the buck-boost converter) without the need of the anterior-circuit controller (the voltage regulator).

The present invention also provides an integrated converter with higher efficiency, more stable output voltage and lower cost.

The present invention further provides an integrated converter which can lower the level of requirement concerning the voltage specification of the energy-storing capacitor of the anterior circuit.

The integrated converter of the present invention includes an input unit, a boost inductor, a voltage regulator, an energy-storing capacitor, a buck-boost converter, a single-ended switch, and a control unit. The input unit receives the electric-power signal transmitted by a power source. The boost inductor is electrically coupled to the input unit.

The voltage regulator includes a first diode, a second diode and a first transformer, wherein the voltage regulator is electrically coupled to the boost inductor through those diodes, and to the buck-boost converter through the first transformer. The first transformer includes a primary winding and a secondary winding. The secondary winding is electrically coupled to those diodes. The primary winding is electrically coupled to the buck-boost converter. The energy-storing capacity is electrically coupled to the boost inductor and the voltage regulator.

The control unit is electrically coupled to the single-ended switch, while the single-ended switch is electrically coupled to the buck-boost converter, so as to optionally alter the induced electromotive force of the first transformer and further switch on the first diode or the second diode alternatively.

In one preferred embodiment, the buck-boost converter includes a primary winding and a secondary winding. The primary winding of the buck-boost converter is electrically coupled to the primary winding of the voltage regulator. The integrated converter also satisfies the following relational expression: $V_+ = V_{p1} + V_{c2}$, wherein $V_+$ denotes the input voltage of the buck-boost converter, $V_{p1}$ denotes the induced voltage of the primary winding of the voltage regulator and $V_{c2}$ denotes the divided voltage of the energy-storing capacitor.

The induced electromotive force of the transformer of the voltage regulator can be altered by the single-ended switch, so as to switch on the diode components alternatively. Furthermore, the goal of exchanging the energy between the boost inductor and the energy-storing capacitor can be accomplished through switching on or off alternatively mentioned above. Owning to the fact that the voltage stress of the energy-storing capacitor varies with the input voltage, the capacitor components with lower voltage can be chosen and, therefore, cost can be saved.

The buck-boost converter can further include a rectifying diode which is coupled to the secondary winding of the buck-boost converter. One end of the single-ended switch is coupled to the primary winding of the buck-boost converter. Another end of this is coupled to the control unit. The control unit can be a pulse-width-modulating controller, while the single-ended switch can be a transistor switch. The drain terminal of this is coupled to the primary winding of the buck-boost converter, the gate terminal of this is coupled to the control unit and the source terminal of this is grounded.

In a preferred embodiment, the control unit can include a bridge rectifier, and can further include a filter capacitor. The filter capacitor is connected in parallel to the boost inductor. The input unit can further include an EMI (Electro-Magnetic Interference) filter, which is coupled to and between the power source and the bridge rectifier.

In other preferred embodiments, the boost inductor and the first transformer of the voltage regulator are an integrated structure sharing common steel cores.

BRIEF DESCRIPTION OF THE DRAWINGS

The primitive objectives and advantages of the present invention will become apparent upon reading the following description and upon reference to the accompanying drawings in which.

DESCRIPTION OF THE PREFERRED EMBODIMENT

In order to fully understand the manner in which the above-recited details and other advantages and objects according to the invention are obtained, a more detailed description of the invention will be rendered by reference to the best-contemplated mode and specific embodiments thereof. The following description of the invention is made for the purpose of illustrating the general principles of the invention and should not be taken in a limiting sense; it is intended to illustrate various embodiments of the invention. As such, the specific modifications discussed are not to be construed as limitations on the scope of the invention. It will be apparent to one skilled in the art that various equivalents, changes, and modifications may be made without departing from the scope of the invention, and it is understood that such equivalent embodiments are to be included herein. The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section. Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list.

Preferred embodiments and aspects of the invention will be described to explain the scope, structures and procedures of the invention. In addition to the preferred embodiments of the specification, the present invention can be widely applied in other embodiments.

Figure 1:
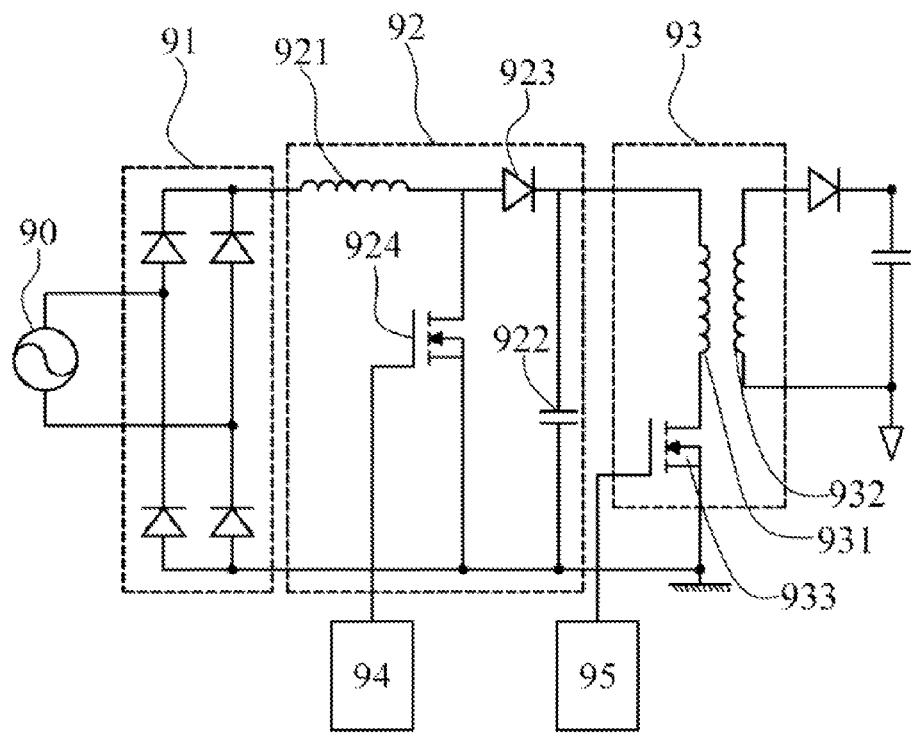
FIG. 1 is a schematic diagram of a traditional power-converting circuit.
Figure 2:
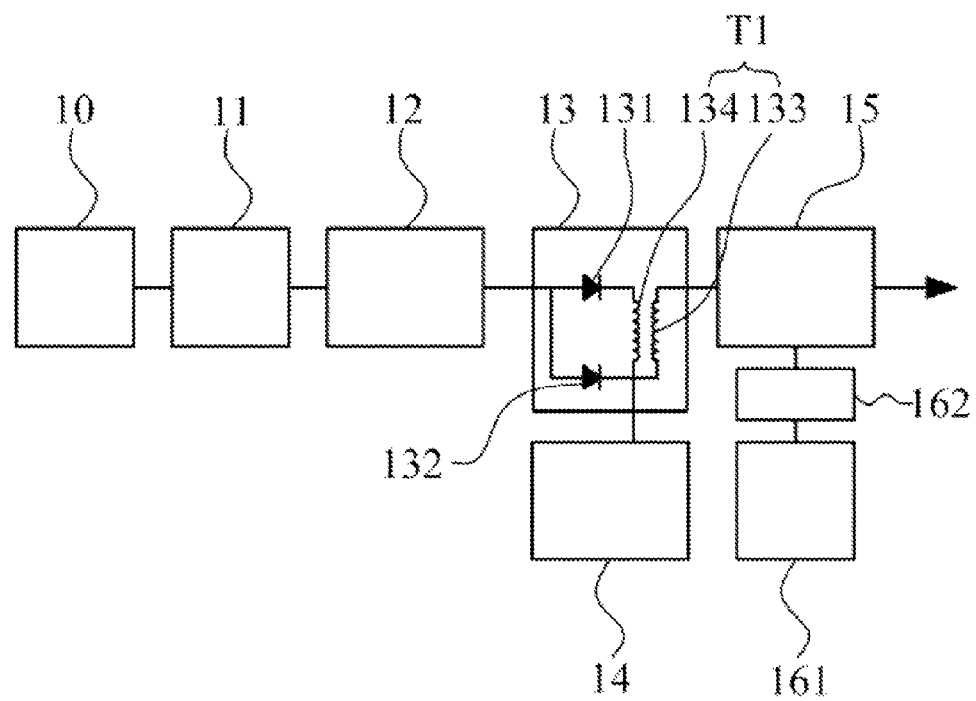
FIG. 2 is a schematic diagram of an integrated converter with single-ended control possessing PFC in accordance with the present invention.

FIG. 2 is the diagram of an integrated converter with single-ended control possessing PFC in accordance with the present invention. The FIG. illustrates that the integrated converter with single-ended control possessing PFC mainly includes an input unit 11, a boost inductor 12, a voltage regulator 13, an energy-storing capacitor 14, a buck-boost converter 15 and a control unit 161 along with a single-ended switch 162. The input unit 11 is used to receive the electric-power signal transmitted by a power source 10, for example, an alternating current supply.

The input unit 11 is coupled to and between the power source 10 and the boost inductor 12. The voltage regulator 13 is coupled to the boost inductor 12 on one hand, and also to the energy-storing capacitor 14 on the other hand. The buck-boost converter 15 is coupled to the output of the voltage regulator 13 in order to receive the regulated electrical-signals, and the control unit 161 is coupled to the buck-boost converter 15 through the single-ended switch 162 so as to control the energy exchange between the boost inductor 12 and the energy-storing capacitor 14.

Alternatively, the voltage regulator 13 includes a first diode 131, a second diode 132 and a first transformer T1. The voltage regulator 13 uses those diodes 131, 132 to be electrically coupled to the boost inductor 12, and uses the first transformer T1 to be electrically coupled to the buck-boost converter 15. The first transformer T1 includes a primary winding 133 and a secondary winding 134. The secondary winding 134 is electrically coupled to those diodes 131, 132. The primary winding 133 is electrically coupled to the buck-boost converter 15, wherein the two diodes 131, 132 is coupled in parallel.

The state of the voltage regulator 13 can be switched by the operation of the control unit 16. That is, the induced electromotive force of the first transformer T1 can be altered, thus optionally causing one of the two situations as follows: the first diode 131 is in a conductive state when the second diode 132 is not, or the other way around.

Figure 3:
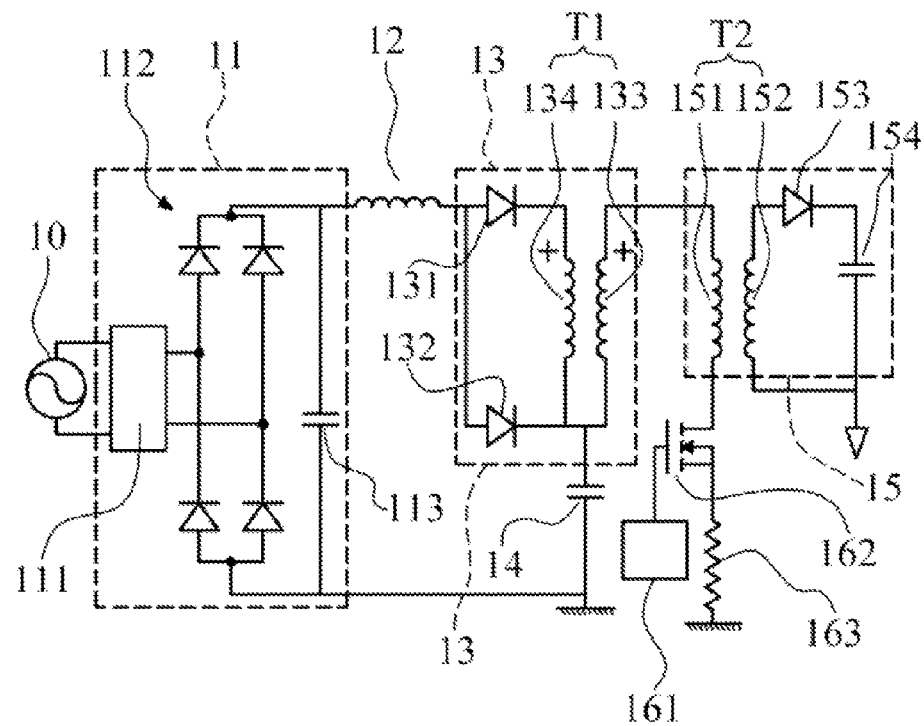
FIG. 3 illustrates the circuit of an integrated converter with single-ended control possessing PFC in accordance with the first preferred embodiment of the present invention.

FIG. 3 illustrates the circuit of the first embodiment in accordance with the present invention. FIG. 2 is also provided to more clearly and specifically demonstrate the circuit of the integrated converter with single-ended control and PFC of the present invention.

In the embodiment, the input unit 11 includes an EMI filter 111, a bridge rectifier 112 and a filter capacitor 113. The EMI filter 111 is coupled to the input end of the bridge rectifier 112 on one hand, and to the power source 10 on the other hand so as to transmit electrical-signal energy to the bridge rectifier 112.

Both the filter capacitor 113 and the boost inductor 12 are connected in series to the bridge rectifier 112, while the filter capacitor 113 is connected in parallel to the boost inductor 12. One end of the filter capacitor 113 is grounded. The filter capacitor 113 can filter the alternating component of the current from the boost inductor 12 and eliminate high-frequency noise.

One end of the boost inductor 12 is coupled to the input of the bridge rectifier 112, when another end of this is coupled to the first diode 131 and the second diode 132. One end of the energy-storing capacitor 14 is grounded, while another end of this is coupled to the first transformer T1.

The buck-boost converter 15 includes a second transformer T2, a rectifying diode 153 and a capacitor 154. The primary side of the second transformer T2 is set with a primary winding 151, and the secondary side with a secondary winding 152. The primary winding 151 of the buck-boost converter 15 is electrically coupled to the primary winding 133 of the voltage regulator 13. One end of the rectifying diode 153 is coupled to the secondary winding 152 of the buck-boost converter 15, and another end of this is coupled in series to the capacitor 154.

One end of the single-ended switch 162 is coupled to the primary winding 151 of the buck-boost converter 15, and another end of this is coupled to the control unit 161. The control unit 161 can be a pulse-width-modulating controller. The single-ended switch 162 can be a transistor switch. The drain terminal of the single-ended switch 162 is coupled to the primary winding 151 of the buck-boost converter 15, the gate terminal of this is coupled to the control unit 161 and the source terminal of this is grounded through a transistor 163.

The pulse-width-modulating controller will send a control signal so as to control the single-ended switch 162. That is, when the single-ended switch 162 is in a conductive state, an electrical signal will pass through the boost inductor 12, the first diode 131, the first transformer T1 and the second transformer T2 in sequence. Energy will eventually be output from the buck-boost converter 15. When the single-ended switch 162 is in a non-conductive state, instead of being transmitted from the first transformer T1 to the second transformer T2, the electrical signal will be transmitted through the boost inductor 12, the second diode 132 and the energy-storing capacitor 14. The two operation modes are equivalent to the circumstance that the boost inductor 12 cooperates with the energy-storing capacitor 14 on energy-storing and energy-releasing.

In another embodiment, the circuit possesses a relational expression as follows: $V_+ = V_{p1} + V_{c2}$, wherein $V_+$ denotes the input voltage of the buck-boost converter 15, $V_{p1}$ denotes the output voltage of the primary winding 133 of the voltage regulator 13, $V_{c2}$ denotes the divided voltage of the energy-storing capacitor 14. By adjusting the ratio of winding turns on the two sides of the first transformer T1 of the voltage regulator 13, the output voltage $V_{p1}$ of the primary side thereof can be controlled, thus controlling the input voltage $V_+$ of the buck-boost converter 15.

Therefore, the circuit structure of the present invention features the fact that the anterior and the posterior circuits (the voltage regulator and the buck-boost converter) share a single control unit while the function of PFC can exactly be performed and, in consequence, the complexity of circuit can be simplified while the number of required components can be reduced. Particularly as a consequence of this, the frequency of switching and the conductive losses of the anterior switch (the voltage regulator) can be reduced and, therefore, the whole efficiency of circuit can be increased.

Further, more general switch components can be selected as the only single-ended switch in use by an appropriate adjustment to the output voltage of the voltage regulator. Under the specially corresponding relationship mentioned above, the voltage stress of the energy-storing capacitor varies with the increase of input voltage, instead of the discrepancy of transforming voltage (that is, the discrepancy between $V_{p1}$ and $V_{s1}$ in accordance with the ratio of winding turns) caused by the voltage regulator. Consequently, the options for the voltage specification of the energy-storing capacitor are more flexible in comparison with those in the prior art, that is, the lower-voltage specification can be selected. Besides, the output ripple with lower magnitude can be produced, so the fluctuation of output voltage will be smaller and steadier output voltage can thus be provided for the posterior loading.

The voltage regulator and the buck-boost converter share a single switch and a control unit to achieve the goal of correcting power factor, simplifying the complexity of circuit and decreasing the number of components.

Figure 4:
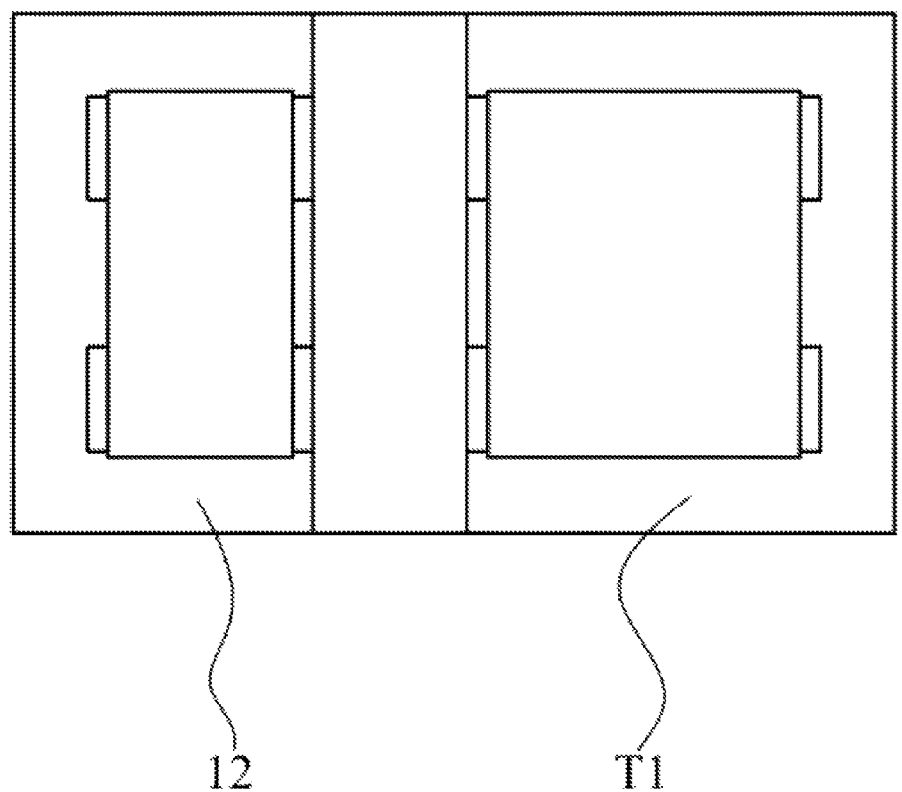
FIG. 4 is a schematic diagram of structural integration between the boost inductor and the transformer of the voltage regulator in accordance with the present invention.

In a preferred embodiment, those two magnetic components, the boost conductor 12 and the first transformer T1 of the voltage regulator, can be considered to merge and share a set of steel cores, thus achieving structural integration as can be seen in FIG. 4. By this, the efficiency of spatial usage of applied products can be increased and, at the same time, the noise interference can be decreased.

The foregoing description, for purposes of explanation, was set forth in specific details of the preferred embodiments to provide a thorough understanding of the invention. However, it will be apparent to one skilled in the art that specific details are not required in order to practice the invention. Therefore, the foregoing descriptions of specific embodiments of the invention are presented for purposes of illustration and description only and should not be construed in any way to limit the scope of the invention. They are not intended to be exhaustive or to limit the invention to the precise forms disclosed; obviously, many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following Claims and their equivalents define the scope of the invention.

The above-described embodiments of the present invention are intended to be illustrative only. Numerous alternative embodiments may be devised by those skilled in the art without departing from the scope of the following claims.

What is claimed is:

1. An integrated converter, comprising:
   an input unit for receiving an electric-power signal transmitted by a power source;
   a boost inductor for being electrically coupled to the input unit;
   a buck-boost converter;
   a voltage regulator comprising:
      a first diode;
      a second diode; and
      a first transformer comprising:
         a primary winding for being electrically coupled to the buck-boost converter; and
         a secondary winding for being electrically coupled to the first diode and the second diode, wherein the voltage regulator is electrically coupled to the boost inductor through the first diode and the second diode, and is electrically coupled to the buck-boost converter through the first transformer;
   an energy-storing capacitor for being electrically coupled to the boost inductor and the voltage regulator;
   a single-ended switch for being electrically coupled to the buck-boost converter; and
   a control unit for being electrically coupled to the single-ended switch so as to optionally alter the electromotive force of the first transformer of the voltage regulator and further switch on the first diode or the second diode alternatively.

2. The integrated converter of claim 1, wherein the buck-boost converter comprises a primary winding and a second winding, the primary winding of the buck-boost converter is electrically coupled to the primary winding of the voltage regulator, and the integrated converter with single-ended control and power factor correction also satisfy the following relational expression: $V_+ = V_{p1} + V_{c2}$, wherein $V_+$ denotes the input voltage of the buck-boost converter, $V_{p1}$ denotes the induced voltage of the primary winding of the voltage regulator, and $V_{c2}$ denotes the divided voltage of the energy-storing capacitor.

3. The integrated converter of claim 2, wherein the buck-boost converter further comprises a rectifying diode which is coupled to the secondary winding of the buck-boost converter.

4. The integrated converter of claim 2, wherein one end of the single-ended switch is coupled to the primary winding of the buck-boost converter, and another end of the single-ended switch is coupled to the control unit.

5. The integrated converter of claim 4, wherein the control unit is a pulse-width-modulating controller.

6. The integrated converter of claim 4, wherein the single-ended switch is a transistor switch, a drain terminal of the single-ended switch is coupled to the primary winding of the buck-boost converter, a gate terminal of the single-ended switch is coupled to the control unit, and a source terminal of the single-ended switch is grounded.

7. The integrated converter of claim 1, wherein the input unit comprises a bridge rectifier.

8. The integrated converter of claim 7, wherein the control unit further comprises a filter capacitor and the filter capacitor is connected in parallel to the boost inductor.

9. The integrated converter of claim 8, wherein the input unit further comprises an electromagnetic interference filter which is coupled to and between the power source and the bridge rectifier.

10. The integrated converter of claim 1, wherein the boost inductor and the first transformer of the voltage regulator are an integrated structure sharing steel cores.

\* \* \* \* \*